(12) United States Patent
Fritsch et al.

(10) Patent No.: US 10,996,122 B2
(45) Date of Patent: May 4, 2021

(54) LOAD CELL WITH AN EXTERNAL INTERFACE AND WEIGHING FOOT WITH A LOAD CELL

(71) Applicant: Bizerba SE & Co. KG, Balingen (DE)

(72) Inventors: Andreas Fritsch, Balingen (DE); Annika Gutmacher, Balingen (DE); Jens Eschment, Bisingen (DE); Frank Metzger, Albstadt (DE)

(73) Assignee: Bizerba SE & Co. KG, Balingen (DE)

( * ) Notice: Subject to any disclaimer, the term of this patent is extended or adjusted under 35 U.S.C. 154(b) by 0 days.

(21) Appl. No.: 16/722,506

(22) Filed: Dec. 20, 2019

(65) Prior Publication Data
US 2020/0200619 A1 Jun. 25, 2020

(30) Foreign Application Priority Data

Dec. 20, 2018 (EP) .................................... 18214937

(51) Int. Cl.
*G01L 1/22* (2006.01)
*G01G 3/14* (2006.01)
*G01L 1/04* (2006.01)

(52) U.S. Cl.
CPC .......... *G01L 1/2231* (2013.01); *G01G 3/1408* (2013.01); *G01L 1/04* (2013.01); *G01G 3/141* (2013.01)

(58) Field of Classification Search
CPC .......... G01G 3/141; G01G 21/07; G01G 3/15; G01G 3/1404; G01L 1/2231; G01L 1/2237; G01L 1/2212; G01L 1/086
See application file for complete search history.

(56) References Cited

U.S. PATENT DOCUMENTS

| | | | | |
|---|---|---|---|---|
| 3,427,875 A | * | 2/1969 | Saxl ...................... | G01L 1/2231 73/862.045 |
| 3,521,484 A | * | 7/1970 | Johansen ............... | G01G 19/12 73/781 |

(Continued)

FOREIGN PATENT DOCUMENTS

| DE | 35 34 608 A1 | 4/1987 |
|---|---|---|
| DE | 10 2016 117 539 A1 | 3/2018 |

(Continued)

OTHER PUBLICATIONS

European Search Report in Corresponding European Patent Application 18214937.7 dated Jun. 7, 2019 (three pages).

*Primary Examiner* — Tran M. Tran
(74) *Attorney, Agent, or Firm* — Kilpatrick Townsend & Stockton LLP (57) ABSTRACT

A load cell for installing in a weighing foot is described with a spring body, a measuring transducer for generating an output signal corresponding to a weight acting on the force introduction element, and an external interface connected to the measuring transducer. The spring body can have an outer support ring, a force introduction element, and an annular deformation section, the support ring and the force introduction element being connected with the annular deformation section. The external interface can output the output signal generated by the measuring transducer to an external device. The external interface for the external output of the output signal is provided at the force introduction element.

16 Claims, 9 Drawing Sheets

(56) References Cited

U.S. PATENT DOCUMENTS

| | | | | |
|---|---|---|---|---|
| 3,698,495 | A * | 10/1972 | Vogt | G01G 3/1404 177/211 |
| 4,047,427 | A * | 9/1977 | Young | B23Q 1/0054 73/862.041 |
| 4,507,170 | A * | 3/1985 | Myhre | G01L 9/0051 216/100 |
| 4,586,577 | A * | 5/1986 | Hatamura | G01L 1/2231 177/211 |
| 4,614,118 | A * | 9/1986 | Strickland, Jr. | G01L 1/02 73/701 |
| 4,739,848 | A * | 4/1988 | Tulloch | G01G 3/1402 177/211 |
| 4,800,973 | A * | 1/1989 | Angel | G01G 3/1406 177/210 C |
| 4,949,799 | A * | 8/1990 | Wernimont | G01G 3/1404 177/1 |
| 5,024,107 | A | 6/1991 | Bethe | |
| 5,111,702 | A * | 5/1992 | Antkowiak | G01L 1/26 338/5 |
| 5,163,660 | A * | 11/1992 | Yamaoka | B60G 13/003 267/136 |
| 5,186,043 | A * | 2/1993 | Yamaoka | G01L 1/2231 73/117.03 |
| 5,216,422 | A * | 6/1993 | Kaye | G01L 5/223 341/20 |
| 5,313,022 | A * | 5/1994 | Piroozmandi | G01L 1/2231 177/132 |
| 5,394,756 | A * | 3/1995 | Gustafsson | G01L 1/125 73/862.69 |
| 5,646,375 | A * | 7/1997 | Neuman | G01G 3/1412 177/229 |
| 5,801,339 | A * | 9/1998 | Boult | G01G 17/08 177/261 |
| 5,861,582 | A * | 1/1999 | Flanagan | G01G 3/13 177/144 |
| 6,005,199 | A * | 12/1999 | Harada | G01L 1/2231 177/211 |
| 6,417,466 | B2 * | 7/2002 | Gross | G01G 3/12 177/211 |
| 6,711,960 | B2 * | 3/2004 | Kobayashi | G01G 3/141 73/862.046 |
| 6,797,892 | B2 * | 9/2004 | Golla | B60N 2/002 177/144 |
| 7,040,182 | B2 * | 5/2006 | Teraoka | G01L 1/22 73/862.627 |
| 7,204,010 | B2 * | 4/2007 | Germanton | G01G 3/12 29/595 |
| 7,240,570 | B2 * | 7/2007 | McDearmon | G01L 5/161 73/862.322 |
| 7,261,254 | B2 | 8/2007 | Mindler | |
| 7,343,223 | B2 * | 3/2008 | Miura | B25J 13/085 318/568.12 |
| 7,380,475 | B2 * | 6/2008 | Selig | G01G 19/4142 73/862.621 |
| 7,441,470 | B2 | 10/2008 | Morimoto | |
| 7,444,879 | B2 * | 11/2008 | Kurtz | G01B 7/18 73/720 |
| 7,444,881 | B2 * | 11/2008 | Sautter | G01G 19/4142 73/779 |
| 7,444,889 | B2 * | 11/2008 | Wehinger | G01G 3/12 177/144 |
| 7,458,276 | B2 * | 12/2008 | Mizuno | G01G 3/15 73/779 |
| 7,475,606 | B2 * | 1/2009 | Selig | G01G 19/4142 73/862.626 |
| 7,603,217 | B2 * | 10/2009 | Plocher | B60N 2/002 280/735 |
| 7,832,290 | B2 * | 11/2010 | Hose-Von Wolfframsdorff | G01G 3/141 73/862.627 |
| 7,870,796 | B2 * | 1/2011 | Hayakawa | G01L 1/20 73/862.046 |
| 7,910,841 | B2 * | 3/2011 | Germanton | G01G 21/23 108/57.12 |
| 8,113,065 | B2 * | 2/2012 | Ohsato | G01L 1/18 29/592.1 |
| 8,256,306 | B1 * | 9/2012 | Bauer | G01L 1/2231 73/862.474 |
| 8,567,240 | B2 * | 10/2013 | Isono | G01L 5/0019 73/146 |
| 8,648,267 | B2 * | 2/2014 | Honda | G01G 21/23 177/211 |
| 8,661,916 | B2 * | 3/2014 | Hose von Wolfframsdorff | G01G 3/14 73/862.045 |
| 8,733,182 | B2 * | 5/2014 | Huizinga | G01L 5/28 73/862.045 |
| 8,955,393 | B2 * | 2/2015 | Simons | B66F 17/003 73/862.045 |
| 9,003,896 | B2 * | 4/2015 | Nold | G01L 3/1457 73/862.321 |
| 9,174,831 | B2 * | 11/2015 | Rothkegel | G01G 3/141 |
| 9,366,588 | B2 * | 6/2016 | Lee | G01L 1/26 |
| 9,383,271 | B2 * | 7/2016 | Ojima | G01L 1/22 |
| 9,383,277 | B2 * | 7/2016 | Okada | G01L 1/26 |
| 9,404,820 | B2 * | 8/2016 | Gutierrez Lopez | G01L 17/005 |
| 9,526,451 | B1 * | 12/2016 | Berme | G01M 1/122 |
| 9,772,240 | B2 * | 9/2017 | Hulse | F16F 1/027 |
| 9,791,332 | B2 * | 10/2017 | Jaeger | G01G 3/1408 |
| 9,939,309 | B2 * | 4/2018 | Carreel | G01G 3/1404 |
| 10,345,163 | B2 * | 7/2019 | Iesato | G01L 1/225 |
| 10,768,061 | B2 * | 9/2020 | Burgwin | G01L 9/0076 |
| 2008/0006450 | A1 * | 1/2008 | Simons | G01G 19/12 177/211 |
| 2008/0178688 | A1 | 7/2008 | Hirabayashi | |
| 2009/0211377 | A1 * | 8/2009 | Blundred | G01L 1/20 73/862.627 |
| 2020/0200620 | A1 * | 6/2020 | Fritsch | G01L 1/2231 |

FOREIGN PATENT DOCUMENTS

| | | |
|---|---|---|
| EP | 0 266 917 A1 | 5/1988 |
| EP | 0 351 006 A2 | 7/1989 |
| EP | 0 590 713 A2 | 4/1994 |
| EP | 0 640 813 A1 | 3/1995 |
| EP | 1 953 514 A2 | 8/2008 |
| EP | 1 998 150 A1 | 12/2008 |
| EP | 3 093 244 B1 | 11/2016 |
| WO | 00/73757 A1 | 12/2000 |

* cited by examiner

LOAD CELL WITH AN EXTERNAL INTERFACE AND WEIGHING FOOT WITH A LOAD CELL

This application claims priority to European Patent Application No. 18214937.7 filed Dec. 20, 2018, the disclosure of which is incorporated by reference herein.

The present invention relates to a load cell, in particular to a weighing foot. The load cell comprises a spring body, in particular a spring body rotationally symmetrical about a center axis, having an outer support ring, having an inner force introduction element, and having an annular deformation section via which the support ring and the force introduction element are fixedly connected to one another; a measuring transducer for generating an output signal corresponding to a weight acting on the force introduction element; and means electrically connected to the measuring transducer that are configured to output the output signal generated by the measuring transducer to external of the load cell.

Such load cells are suitable for installation as feet in load carriers such as platforms or containers, e.g. in production/manufacture, in warehouses, in shipping, or in sales and are therefore suitable for the weight detection of different products to be weighed. In such load cells, the output signal, i.e. the scale signal or weight signal, is output via a cable at the outer support ring, such as is known from EP 0 640 813 A1. The cable lies on the floor and leads to a scale terminal on which the output signal is displayed or is otherwise processed. Freely disposed cables can, however, represent trip hazards when they extend over the floor or generally represent areas where persons can be caught or become entangled.

It is the underlying object of the invention to provide a load cell of the initially named kind in which cabling is possible with increased safety.

This object is satisfied by a load cell having the features of claim 1 and in particular in that the means for the external output of the output signal are provided at the force introduction element.

It is possible through the arrangement of the means for the external output of the output signal at the force introduction side that the weighing signal does not have to be output via the support ring and thus not via a freely disposed cable, but the weighing signal can rather be output via the force introduction element directly upwardly to the load carrier whose weight is determined and to a weighing terminal arranged thereon. Freely disposed lines or cables can even be completely avoided here. In general, the measuring transducer can also be supplied with energy via the means for the external output of the output signal.

The means for the external output of the output signal are preferably an external interface, in particular a standardized external interface, so that the load cell can be particularly simply electrically coupled to the load carrier. It would, however, generally also be possible that the means are implemented by a cable having a cut-off cable end that is connected via screw terminals or the like to conductors for the scale terminal at the load carrier side.

The external interface can in particular be a plug connector, in particular a rotationally symmetrical plug connector, a hardware interface, or a transmitter. The plug connector can, for example, be configured as a jack so that the alignment of the load cell or of the weighing foot in the direction of rotation relative to the load carrier does not play any role due to the rotationally symmetrical design of said jack. The transmitter can be configured as an RF-ID transmitter, in particular in accordance with the NFC standard. With a transmitter, the data transmission between the load cell and the load carrier takes place contactlessly. In this case, the coupling to the load carrier can take place completely without any installation effort or automatically.

The measuring transducer can comprise a plurality of strain gauges, in particular four, arranged on the deformation section to detect a stretching and/or compressive deformation of the spring body and an evaluation circuit electrically connected to the strain gauges that is configured to generate the output signal. The strain gauges are typically electrically connected to form a Wheatstone bridge or as a part thereof, in particular a full bridge.

It is preferred here if the evaluation circuit is provided at the force introduction element, in particular in the interior of a force introduction element configured as a force introduction pipe. The plurality of strain gauges are preferably arranged at the lower side on the deformation section, in particular on a use of a force introduction pipe having an evaluation circuit arranged therein since then a bond wire connection between the strain gauges and the evaluation circuit is easily possible.

Alternatively, the measuring transducer can comprise a Hall sensor that is configured to cooperate with a magnet. The accuracy of a Hall sensor is admittedly smaller than on a use of strain gauges, but a Hall sensor is less expensive in comparison with strain gauges. The Hall sensor is preferably provided at the force introduction element. The magnet can then be provided at a lower part of a weighing foot. In general, the arrangement can also be reversed, i.e. the Hall sensor is arranged at the lower part and the magnet is arranged at the force introduction element.

The annular deformation section is preferably configured as an annular membrane. The load cell is then a membrane load cell. The membrane can furthermore be provided with a peripheral annular web at the upper side. The strain gauges are preferably arranged at a point at which a stretching or compression of the spring body that is as strong as possible takes place on a force introduction to generate a signal that is as high as possible. The width of the point at which the greatest stretching or compression of the spring body takes place can be increased by the peripheral annular web.

As already explained above, the force introduction element can be configured as a force introduction pipe that is in particular vertically oriented. Means for the external output of the output signal can then be arranged in the interior of the force introduction pipe. The interior of the force introduction pipe can in particular form a cable via. Provision can furthermore be made that the aforesaid evaluation circuit of the measuring transducer and/or an electrical energy store for the measuring transducer is/are arranged in the interior of the force introduction pipe. The electrical energy store can, for example, be a battery, in particular a rechargeable battery. An electrical energy store is in particular of advantage on a contactless data transmission between the load cell and the load carrier.

It is particularly preferred if the spring body is configured as monolithic, in particular as a rotating part. The spring body is thus not a complex component composed of a plurality of single parts. The spring body can thus be manufactured comparatively simply The present invention furthermore relates to a weighing foot having a load cell as has been described above.

It is particularly preferred here if the force introduction element has an external thread at its upper end. The weighing foot can thereby easily, in particular also subsequently, be screwed to any desired load carriers such as load plates, pallets, crates, shelves, shelf racks, table feet, or the like.

The weighing foot preferably comprises a lower part, in particular of spherical segment shape, on which the outer support ring of the load cell is supported. It is preferred here if the lower part downwardly hermetically tightly seals the deformation section for protection from foreign bodies and water.

The present invention furthermore relates to a weighing system having a plurality of weighing feet, in particular two or four, such as have been described above, and having a load carrier supported on the plurality of weighing feet.

Further advantageous embodiments of the invention are described in the claims, in the description of the Figures, and in the drawing.

The invention will be described in the following by way of example with reference to the drawing. There are shown FIG. 1 a weighing foot in accordance with the invention in a perspective view.

Figure 1:
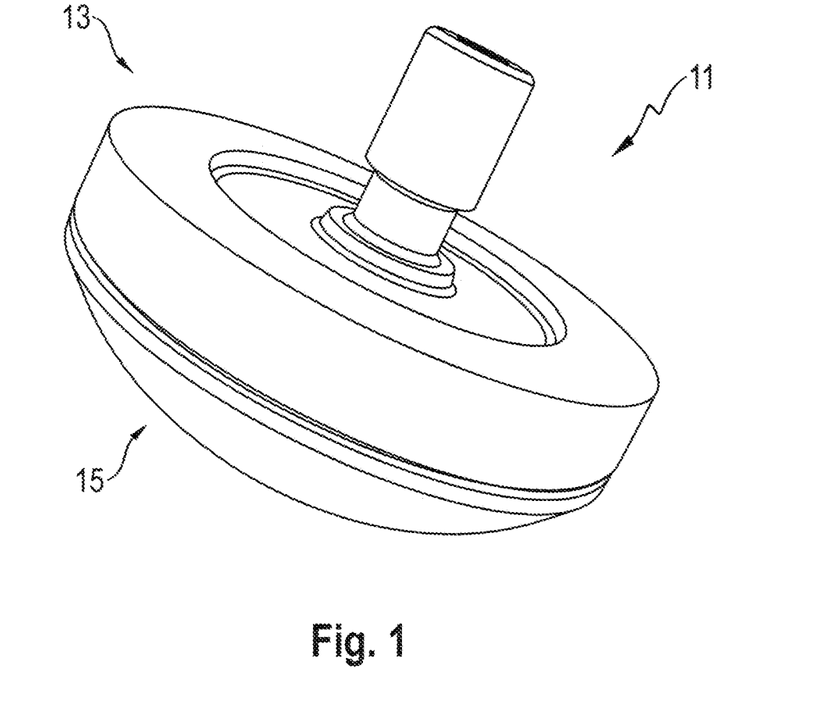

The weighing foot 11 in accordance with the invention shown in FIG. 1 comprises a load cell 13 in accordance with the invention and a lower part 15 that has the shape of a spherical segment, that is configured as a solid body, and on which the load cell 13 is supported. The load cell 13 comprises a spring body 17 that is formed as monolithic and is rotationally symmetrical about a center axis A (cf. FIG. 2). The spring body 17 comprises an outer support ring 19 and an upwardly projecting inner force introduction element 21. The outer support ring 19 and the inner force introduction element 21 are fixedly connected to one another via an annular deformation section 23. The connection between the load cell 13 and the lower part 15 is such that the load cell 13 is supported on the lower part 15 via the outer support ring 19 and the deformation section 23 is downwardly hermetically tightly sealed by the lower part 15.

Figure 2:
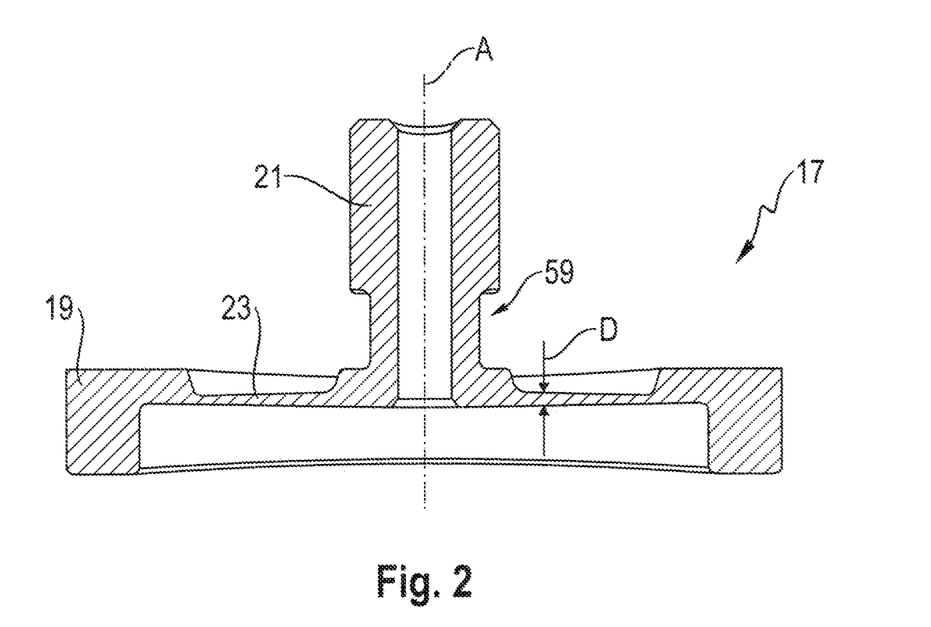
FIG. 2 a spring body in cross-section.

The annular deformation section 23 is formed as an annular membrane 23. The inner force introduction element 21 is formed as a vertically oriented force introduction pipe 21 at whose upper end an external thread is provided via which the weighing foot 11 an be screwed into a load carrier from below.

Figure 3:
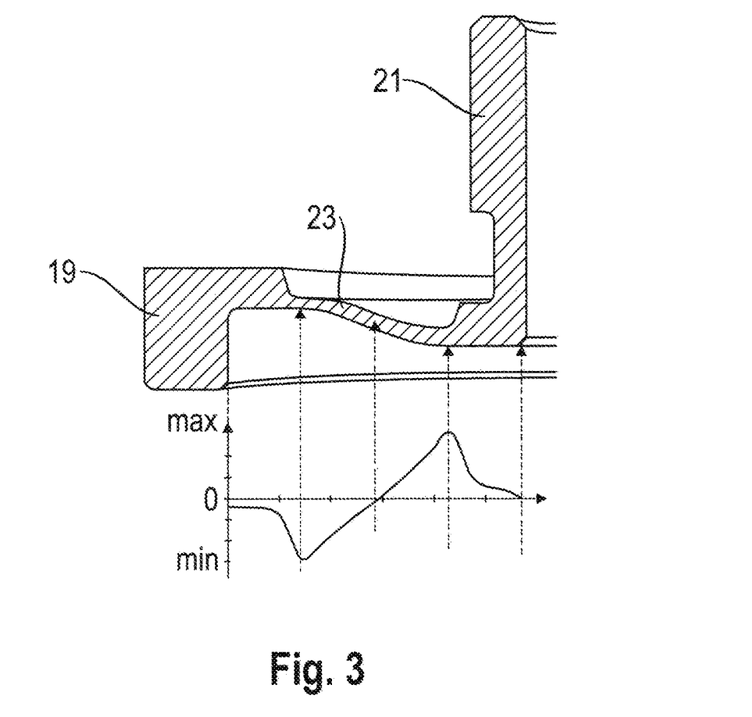
FIG. 3 a part view of the spring body of FIG. 2 under the action of a weight load.

If a weight force acts on the spring body 17 via the force introduction pipe 21, the force introduction pipe 21 moves, in particular relative to the stationary outer support ring 19, slightly vertically downwardly, with the membrane 23 of the spring body 17 deforming in the manner shown in FIG. 3. In the lower half of FIG. 3, a diagram is shown that the shows the strain distribution of the spring body 17, i.e. the strain of the spring body 17 in dependence on the respective radial position. As results from this diagram with reference to the shown maximum or minimum of the curve representing the strain distribution, the lower side of the spring body 17 undergoes a stretching (positive strain) on a load in the region of the transition to the force introduction pipe 21 and a compression (negative strain) in the region of the transition to the outer support ring 19. The curve shown has a zero point between the maximum and the minimum.

This deformation of the spring body 17 can be detected via four strain gauges 27 that are attached to the planar lower side of the membrane 23, that are in particular arranged in the two aforesaid regions, and whose electrical resistance changes in dependence on the strain (cf. FIG. 4), with two respective strain gauges 27 being arranged at two mutually oppositely disposed sides of the force introduction pipe 21. As results from a comparison with FIG. 3, the two inwardly disposed strain gauges 27 are strain gauges subject to tension that detect a stretching of the membrane 23 and the two outwardly disposed strain gauges 27 are strain gauges subject to compression that detect a compression of the membrane 27.

Figure 5A:
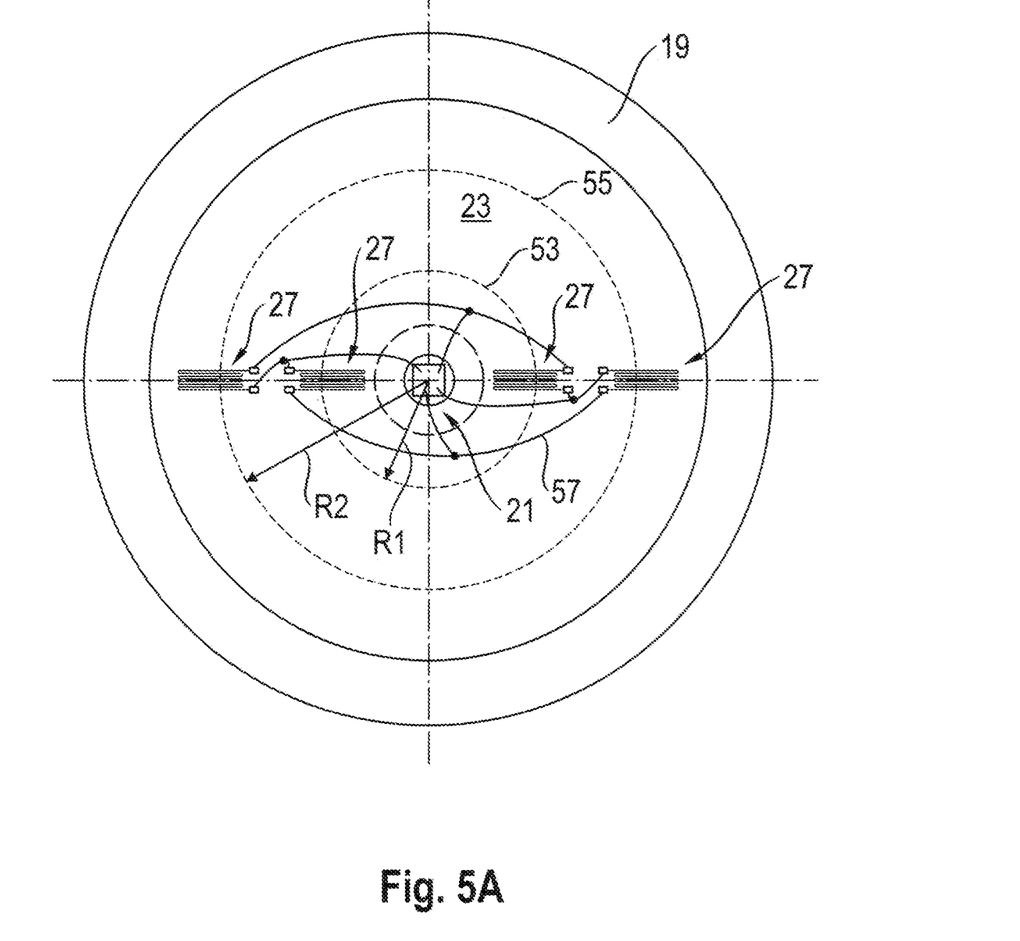
FIG. 5A a view from below of the spring body in accordance with FIG. 4, with the strain gauges having a first arrangement.

As shown in more detail in FIG. 5A, the four strain gauges 27 are electrically connected via bond wires 57 (of which only one is provided with a reference numeral for reasons of clarity) to form a Wheatstone full bridge, with the measurement grids of the strain gauges 27 each being oriented in a radial direction, i.e. the measurement direction of the strain gauges 27 is in a radial direction in each case. The two inner strain gauges 27 subjected to tension are disposed on a first circle 52 having a first radius R1 and the two outer strain gauges 27 subjected to compression are disposed on a second circle 55 having a larger second radius R2. The four strain gauges 27 are here arranged along a common line through the center axis A of the spring body 17. The production tolerance can be increased by the linear arrangement of the strain gauges 27 and the symmetry associated therewith since then at least specific production deviations can mutually compensate one another.

Figure 5B:
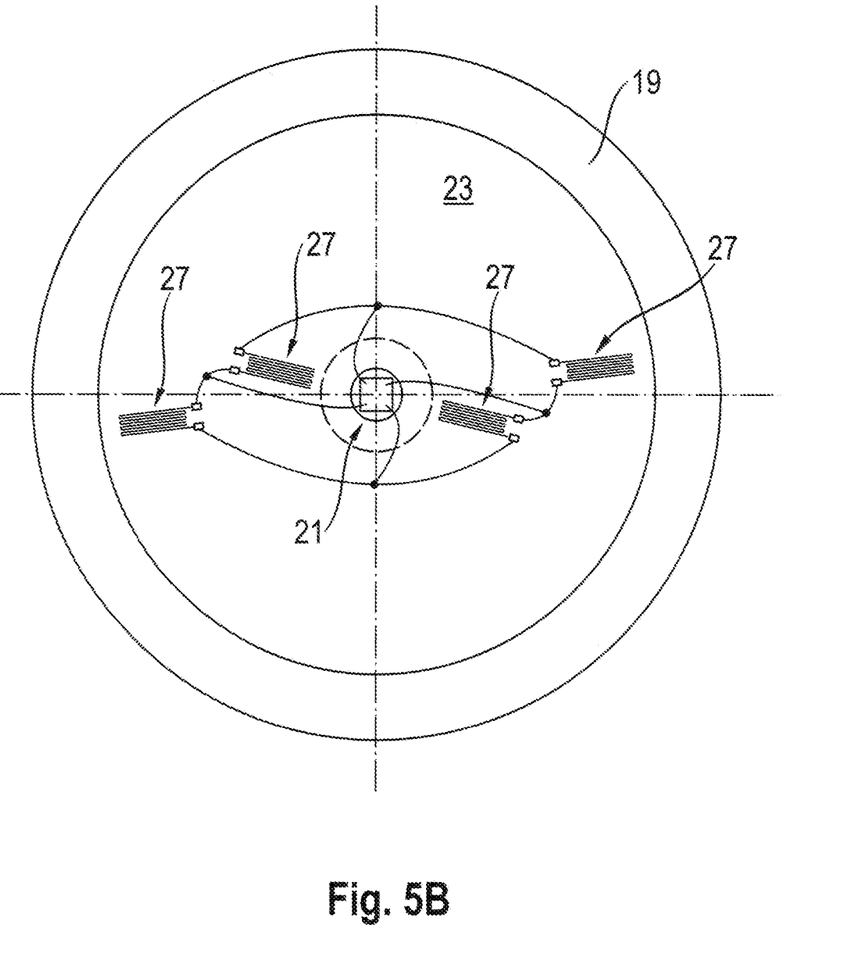
FIG. 5B the spring body of FIG. 2, but with the strain gauges having a second arrangement.

It can be seen from FIG. 5B that the strain gauges 27 can also be positioned slightly differently from the linear arrangement in accordance with FIG. 5A, in particular such that the two inner strain gauges 27 are arranged along a first line and the two outer strain gauges 27 are arranged along a second line through the center axis A of the spring body 17, with the two lines being slightly rotated with respect to one another. It is hereby made possible to reduce the radial spacing of the two strain gauges 27 arranged next to one another on one side such that a spring body 17 having a smaller diameter can be selected, whereby the load cell 13 can be designed in more compact form. The advantage of higher production tolerance stated in connection with the linear arrangement in accordance with FIG. 5A is retained here, i.e. is largely maintained with a slightly deviating positioning.

As can in particular be recognized from FIG. 2, the mean thickness D of the annular membrane 23 is larger in the region of the smaller first radius R1, i.e. with the two inner strain gauges 27, that in the region of the second radius R2, i.e. with the two outer strain gauges 27. It is hereby made possible that the same or at least similar strains are obtained in amount in both regions so that the resistance/load characteristics of the two inner strain gauges 27, on the one hand, and the resistance/load characteristics of the two outer strain gauges 27, on the other hand, at least substantially correspond to one another in amount—despite different radii. The evaluation of the bridge voltage of the bridge circuit is hereby facilitated and the accuracy of the load cell 13 is increased.

The greater thickness of the membrane 23 further inwardly in comparison with further outwardly can be due to the ratios of moment of inertia of an area and the spacing of the respective region to the force introduction. Formulated in illustrative or simplified form, a small thickness is required in the region of the larger second radius R2 due to the larger periphery to arrive at the same material volume and thus at an analog strain behavior as in the region of the smaller first radius R2 having the smaller periphery.

In accordance with the embodiment shown, the thickness of the membrane 23 decreases monotonously, in particular linearly, from the inside to the outside. Such a membrane 23 can be manufactured in a particularly simple manner. However, other transitions from the larger inner thickness to the smaller outer thickness are generally conceivable, for example a step-like reduction.

At its upper side, the annular membrane 23 respectively has a rounded extent in its transition region to the outer support ring 19 and in its transition region to the inner force introduction element 21. The inner force introduction element 21 furthermore has an undercut 59 at its lower end such that the force introduction takes place as closely as possible to the center axis A of the spring body 17. The accuracy of the load cell 13 can hereby be considerably further improved in each case.

The strain gauges 27 are electrically connected to an evaluation circuit 41 (cf. FIG. 4) that calculates in a manner known per se the weight respectively acting on the load cell 13 from the bridge voltage of the strain gauges 27 connected to form the full bridge and generates a corresponding output signal. The strain gauges 27 therefore form, together with the evaluation circuit 41, a measuring transducer in the sense of the present application. The evaluation circuit 41 is here arranged within the force introduction pipe 21.

Figure 4:
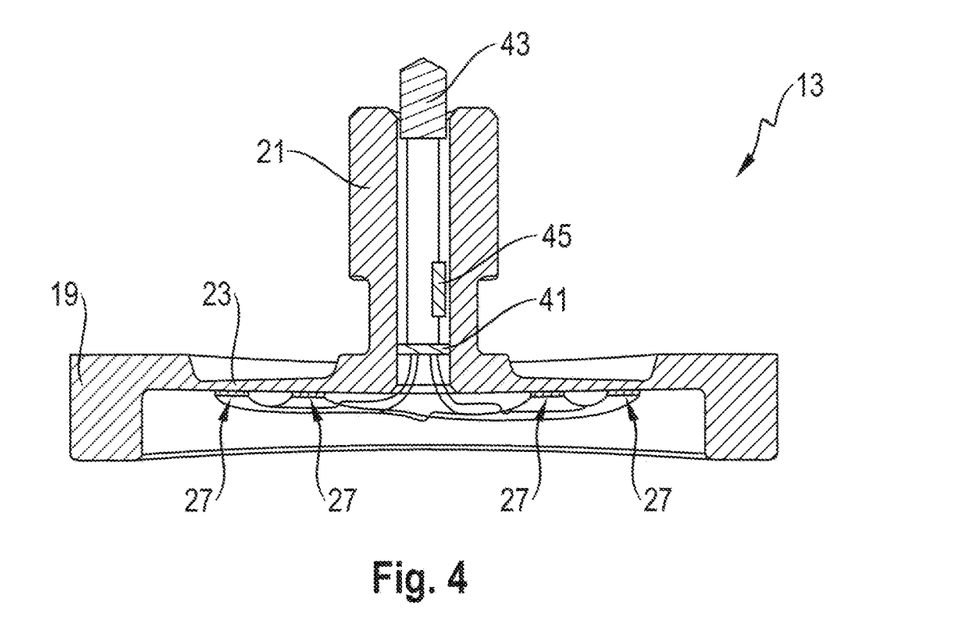
FIG. 4 the spring body of FIG. 2 with strain gauges attached to the lower side.

As is shown in FIG. 4, the output signal of the evaluation circuit 41 can, for example, be output to external, in particular to a load carrier such as is described above and below, via a plug 43 that is electrically connected to the evaluation circuit 41. The plug 43 is here arranged within the force introduction pipe 21. If the weighing foot 11 is screwed via the force introduction pipe 21 or via its external thread from below into a load carrier, this has the advantage that the output signal can be output directly and over the shortest path to the load carrier or to a weighing terminal of the load carrier and can be displayed there without external cables or the like additionally being required for this purpose, such as would be the case if the output signal were output to external at the support ring side. Other external interfaces, in particular contactless means such as a transmitter that can, for example, be based on the NFC standard, can in another respect also be considered as further means for the external output of the output signal.

Provision can in particular be made with a contactless configuration of the interface between the weighing foot 11 and the load carrier that an internal electrical energy store 45 such as a battery is provided to form the load cell 13 or the weighing foot 11 independently, i.e. autonomously, of an external energy supply. The electrical energy store 45 is then preferably likewise arranged within the force introduction pipe 21.

Figure 6A:
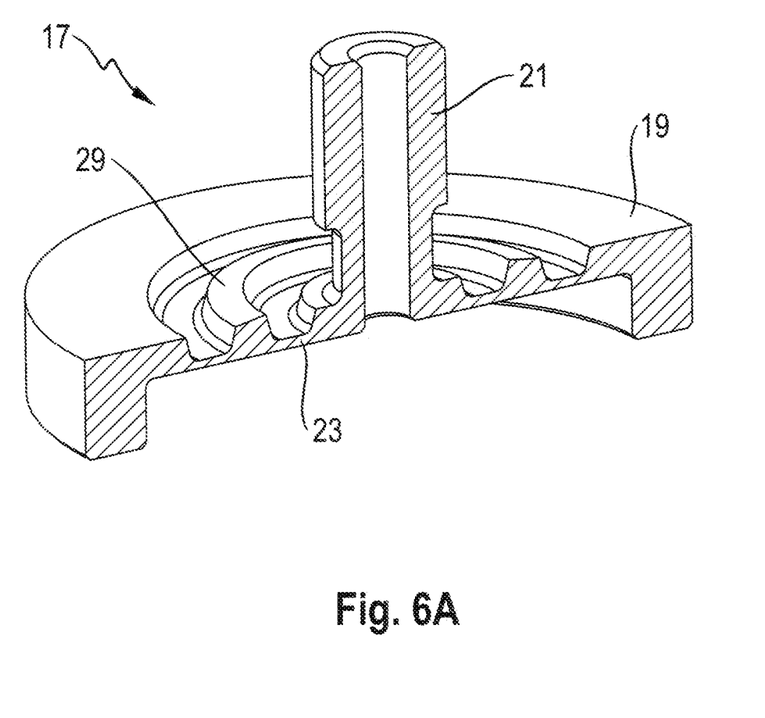
FIG. 6A the spring body of FIG. 2 that is additionally provided with a peripheral annular web at the upper side.

A further embodiment of a spring body 17 is shown in FIG. 6A. In contrast with the spring body 17 in accordance with FIGS. 1 to 4, the membrane 23 of the spring body 17 in accordance with FIG. 6A is provided at its upper side with a peripheral annular web 29 that is arranged at least substantially centrally of the membrane 23 in the radial direction. It has been found that the width of the maximum and the width of the minimum of the strain distribution of the spring body 17 shown in FIG. 3 can hereby be increased. The production tolerance can thereby be increased. It has furthermore been found that it can in particular be advantageous on the presence of the annular web 29 if the two inner strain gauges 27 are arranged overlapping with the inner force introduction pipe 21 and if the two outer strain gauges 27 are arranged overlapping with the outer support ring 19 to obtain dependencies of the relative resistance changes on the strain that are as linear as possible to increase the accuracy of the load cell 13.

Figure 6B:
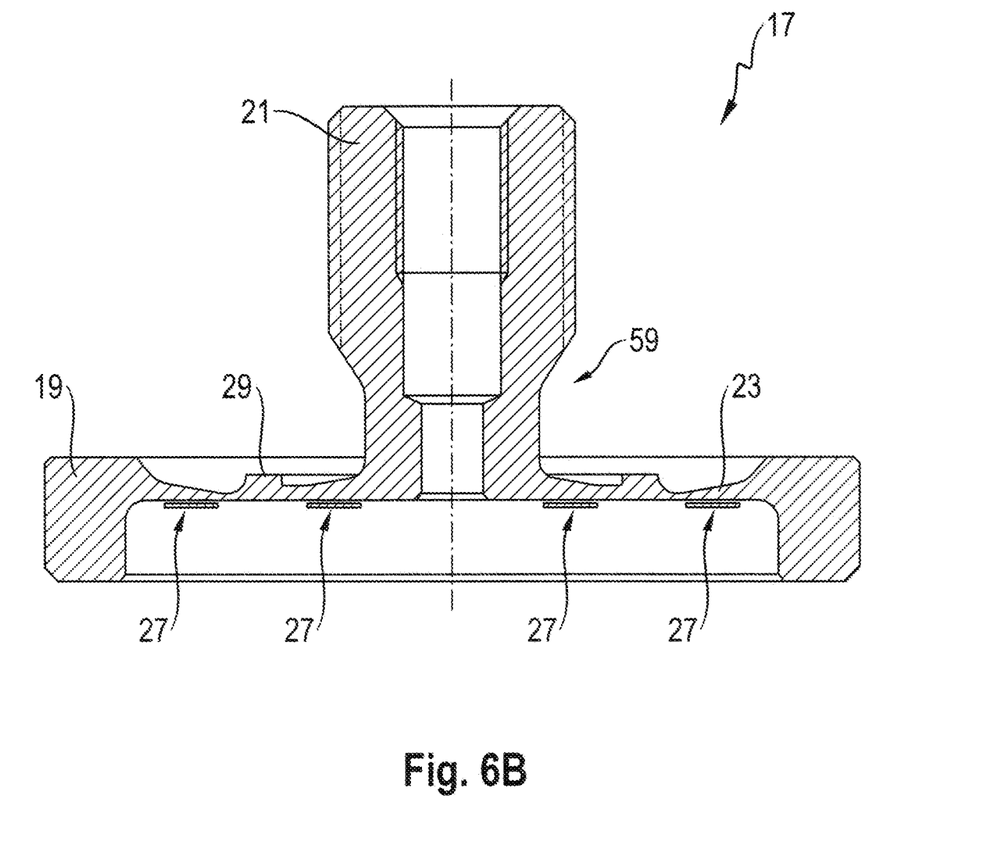
FIG. 6B a spring body in accordance with a further embodiment in cross-section.

A further spring body 17 is shown in a slightly different embodiment in FIG. 6B. The spring body 17 in accordance with FIG. 7 differs from the spring body 17 in accordance with FIG. 2 in that the thickness of the membrane 23 in the region of the two inner strain gauges 27 decreases from the inside to the outside and increases from the inside to the outside in the region of the two outer strain gauges 27. The mean thickness D of the membrane 23 in the region of the two inner strain gauges 27 is here, however, still—and thus in accordance with the invention—larger than the mean thickness D of the membrane 23 in the region of the two outer strain gauges 27. The peripheral annular web 29 is furthermore less high, unlike in the embodiment in accordance with FIG. 6A.

Figure 7:
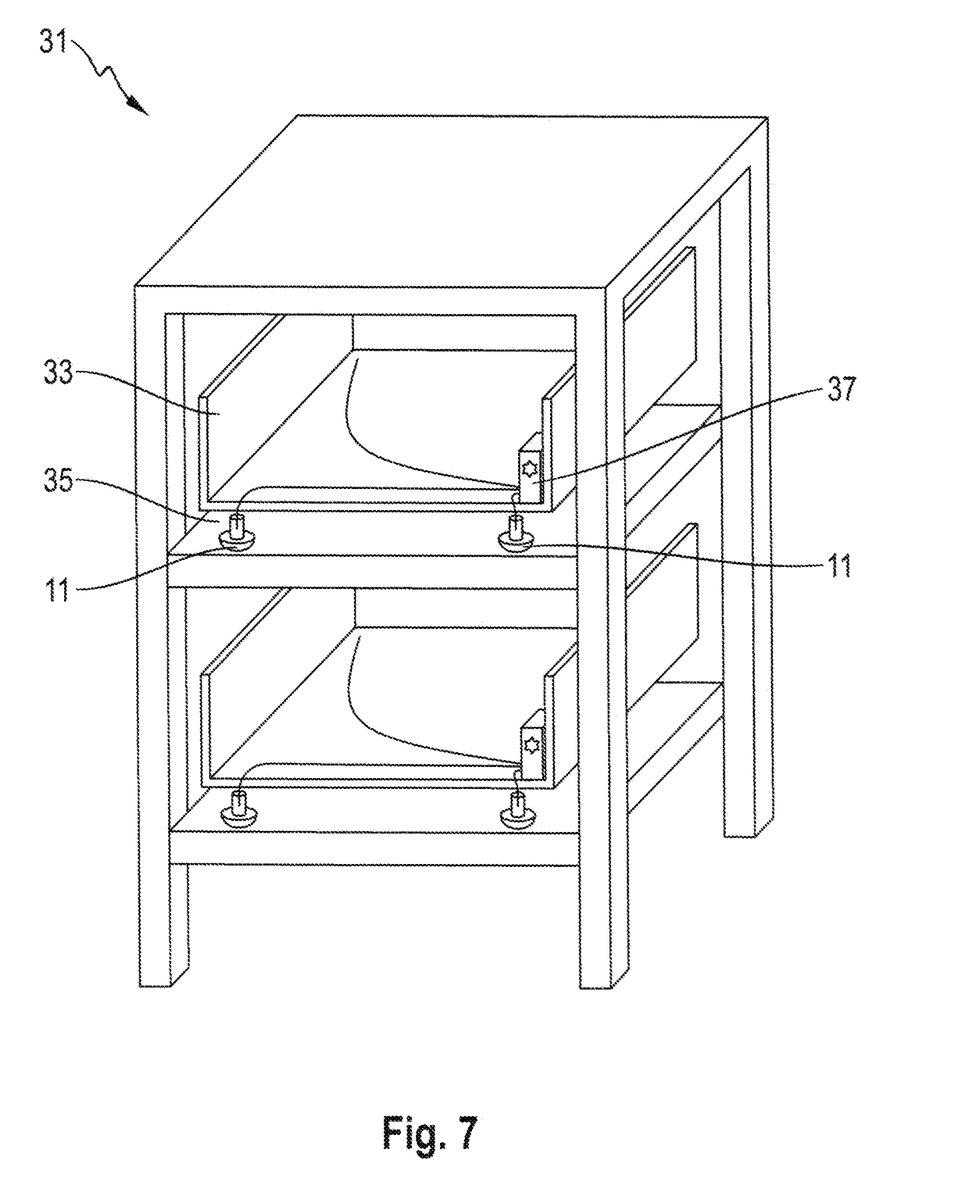
FIG. 7 a weighing system in accordance with the invention.
Figure 8:
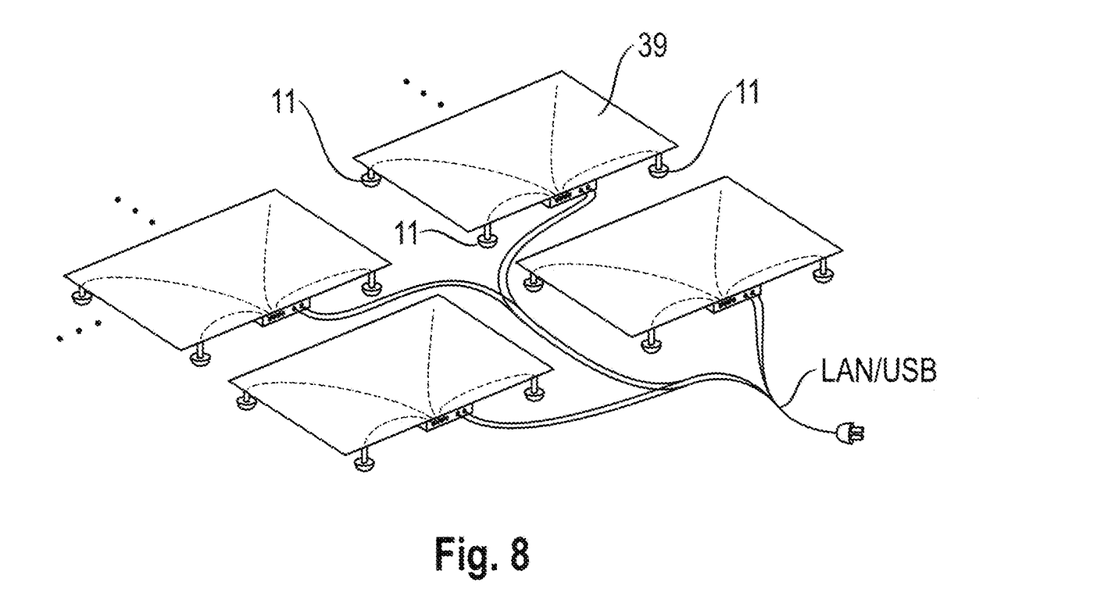
FIG. 8 a further weighing system in accordance with the invention.

FIGS. 7 and 8 show two different applications of the weighing foot 11 in accordance with the invention. In FIG. 7, a supermarket shelf 31 is shown having by way of example two shelf racks 33 that are each set on a shelf bottom 35 via e.g. four weighing feet 11. The total weight of the respective shelf rack 33, including the products located therein, for example bread, can be determined by a respective monitoring device 37 that is connected to all the weighing feet 11 of the respective shelf rack 33. The "filling level" of the shelf rack 33 can hereby be monitored. If the total weight of the shelf rack 33 falls below a predefined value, i.e. a display integrated in the monitoring device 37 or separate therefore can, for example, light up to indicated this state. A plurality of platforms 39, for example pallets such as can be present in a warehouse, are shown in FIG. 8. The platforms 39 are each supported on four weighing feet 11 to determine the total weight of the respective platform 39 including the products arranged thereon. If the same products are stacked on all the platforms 39, the total weights of all the platforms can be combined in a wired or wireless manner, e.g. by wireless LAN, whereby a permanent inventory of the respective product is possible.

Figure 9A:
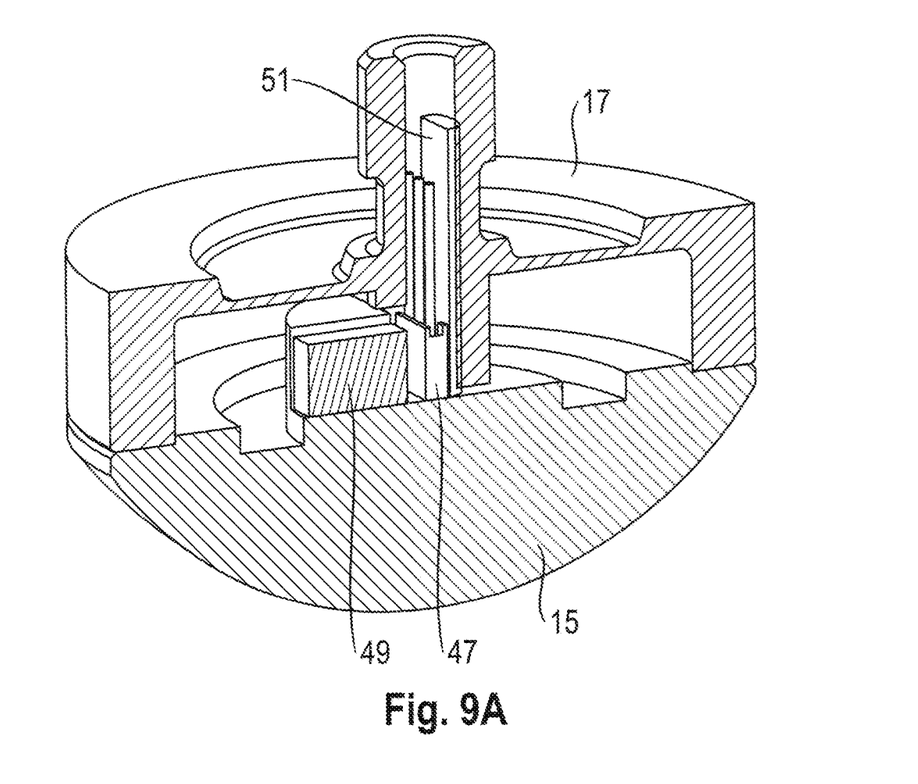
FIG. 9A a spring body in accordance with a further embodiment with a Hall element in a first arrangement.
Figure 9B:
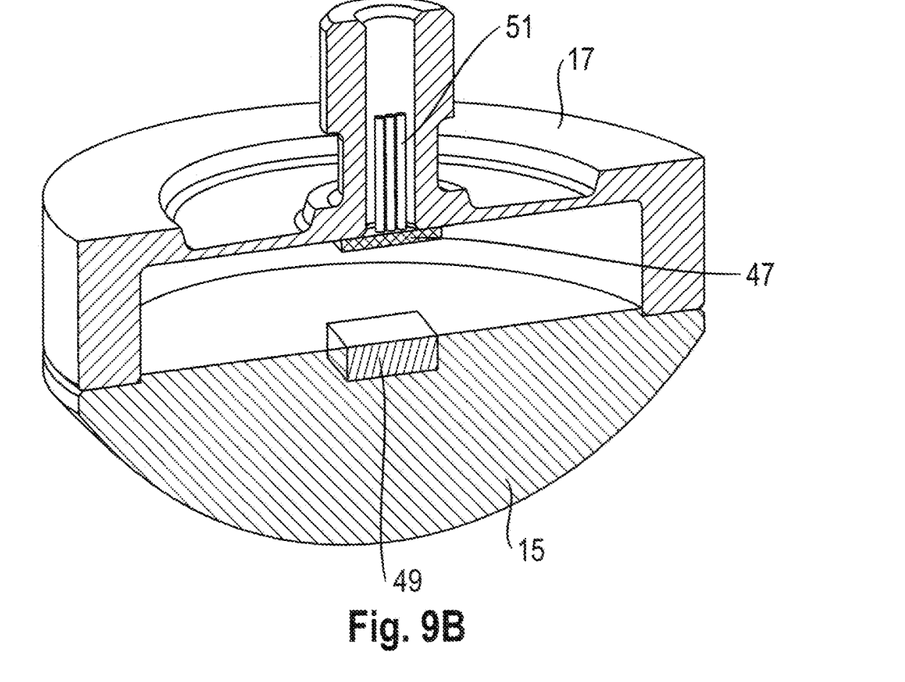
FIG. 9B a spring body similar to FIG. 9A with the Hall element in a second arrangement.
Figure 9C:
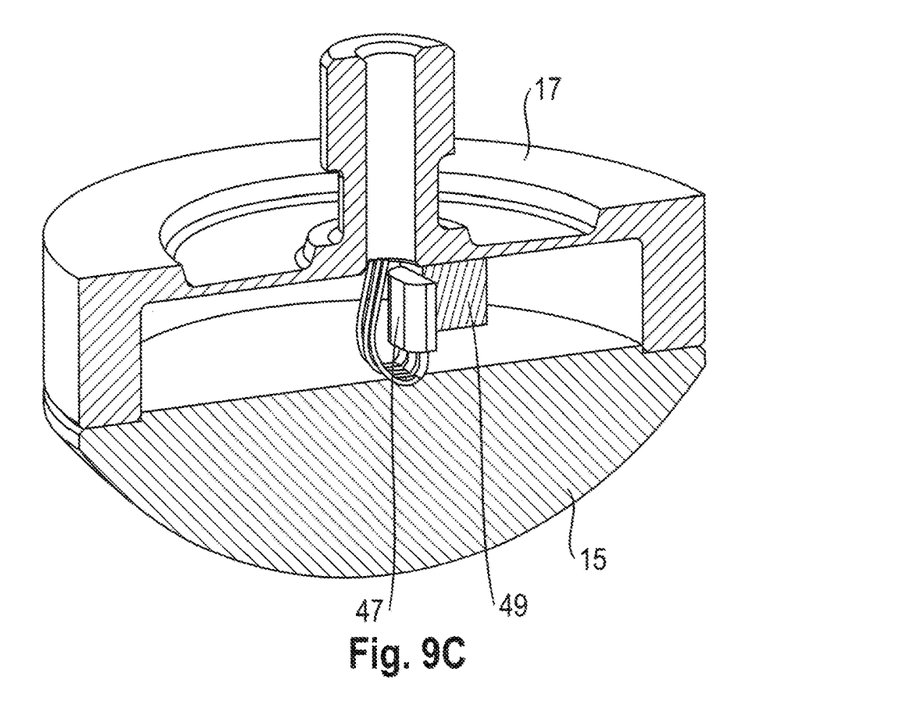
FIG. 9C the spring body of FIG. 9A with the Hall element in a third arrangement.

It is shown in FIGS. 9A to 9C that a measuring transducer based on a Hall sensor 47 can also be used instead of a measuring transducer that is based on strain gauges and an associated evaluation unit. In accordance with FIG. 9A, the Hall sensor 47 can be provided, together with a cabling 51, for this purpose at the force introduction pipe 21 and a magnet 49 whose magnetic field is detected by the Hall sensor can be attached to the upper side of the lower part 15 with respect to which the force introduction pipe 21 moves under the effect of force. The weight acting on the force introduction pipe 21 can be calculated from the change of the magnetic field detected by Hall sensor 47 and caused by the relative movement between the Hall sensor 47 and the magnet 49. The arrangement can here, for example, be selected such that the Hall sensor 47 and the magnet 49 are arranged next to one another. It is furthermore also possible that the magnet 49 is embedded in the lower part 15 and/or that the Hall sensor 47 and the magnet 49 are arranged above one another (cf. FIG. 9B). It is furthermore generally also conceivable that the Hall sensor 47 is attached to the lower part 15 and the magnet 49 is attached to the force introduction pipe 21, as is shown in FIG. 9C.

REFERENCE NUMERAL LIST 11 weighing foot
13 load cell
15 lower part
17 spring body
19 support ring
21 force introduction pipe
23 membrane
27 strain gauge
29 annular web
31 shelf
33 shelf rack
35 shelf bottom
37 monitoring device
39 platform
41 evaluation circuit
43 plug
45 electrical energy store
47 Hall sensor
49 magnet
51 cabling
53 first circuit
55 second circuit
57 bond wire
59 undercut
A center axis
D thickness
R1 first radius
R2 second radius

The invention claimed is:
1. A load cell comprising
a spring body comprising an outer support ring, an inner force introduction element, and an annular deformation section, wherein the outer support ring and the inner force introduction element are fixedly connected to one another with the annular deformation section, wherein the inner force introduction element comprises a force introduction pipe, and wherein the force introduction pipe comprises an outer wall defining an interior of the force introduction pipe;
a measuring transducer configured for generating an output signal corresponding to a weight acting on the inner force introduction element; and
an external interface electrically connected to the measuring transducer, and configured to output the output signal generated by the measuring transducer to a device external to the load cell;
wherein at least one of an electrical energy store for the measuring transducer, the external interface, or an evaluation unit of the measuring transducer is arranged within the interior of the force introduction pipe.
2. The load cell in accordance with claim 1, wherein the external interface is one of a plug connector, a hardware interface, and a transmitter.

3. The load cell in accordance with claim 1, wherein the measuring transducer comprises a plurality of strain gauges arranged on the deformation section and electrically connected to form a Wheatstone bridge or as a part thereof to detect a stretching and/or compressive deformation of the spring body and an evaluation circuit that is electrically connected to the strain gauges and that is configured to generate the output signal.
4. The load cell in accordance with claim 3, wherein the plurality of strain gauges are arranged at a lower side on the deformation section.
5. The load cell in accordance with claim 1, wherein the measuring transducer comprises a Hall sensor that is configured to cooperate with a magnet.
6. The load cell in accordance with claim 5, wherein the Hall sensor is provided at the force introduction element.
7. The load cell in accordance with claim 1, wherein the annular deformation section is formed as an annular membrane.
8. The load cell in accordance with claim 7, wherein the membrane is provided with a peripheral annular web at an upper side.
9. The load cell in accordance with claim 1, wherein the spring body is configured in monolithic form.
10. A weighing foot having a load cell, the load cell comprising
a spring body comprising an outer support ring, an inner force introduction element, and an annular deformation section, wherein the support ring and the force introduction element are fixedly connected to one another with the annular deformation section, wherein the inner force introduction element comprises a force introduction pipe, and wherein the force introduction pipe comprises an outer wall defining an interior of the force introduction pipe;
a measuring transducer configured for generating an output signal corresponding to a weight acting on the force introduction element; and
an external interface electrically connected to the measuring transducer and configured to output the output signal generated by the measuring transducer to a device external to the load cell;
wherein at least one of an electrical energy store for the measuring transducer, the external interface, or an evaluation unit of the measuring transducer is arranged within the interior of the force introduction pipe.
11. The weighing foot in accordance with claim 10, wherein the force introduction element has an external thread at its upper end.
12. The weighing foot in accordance with claim 10, further comprising a lower part supporting and coupled to the outer support ring.
13. The weighing foot in accordance with claim 12, wherein the lower part downwardly hermetically tightly seals the deformation section.
14. A weighing system having a plurality of weighing feet and having a load carrier supported on the plurality of weighing feet, each weighing foot having a load cell, the load cell comprising
a spring body comprising an outer support ring, an inner force introduction element, and an annular deformation section, wherein the support ring and the force introduction element are fixedly connected to one another with the annular deformation section, wherein the inner force introduction element comprises a force introduction pipe, and wherein the force introduction pipe comprises an outer wall defining an interior of the force introduction pipe;

a measuring transducer configured for generating an output signal corresponding to a weight acting on the force introduction element; and an external interface electrically connected to the measuring transducer and configured to output the output signal generated by the measuring transducer to a device external to the load cell;

wherein at least one of an electrical energy store for the measuring transducer, the external interface, or an evaluation unit of the measuring transducer is arranged within the interior of the force introduction pipe.

15. The weighing system in accordance with claim 14, wherein the weighing system has two weighing feet.

16. The weighing system in accordance with claim 14, wherein the weighing system has four weighing feet.

\* \* \* \* \*